(12) United States Patent
Huo (10) Patent No.: US 12,250,513 B2
(45) Date of Patent: Mar. 11, 2025

(54) EARPHONE WITH ANTENNA PERIPHERALS AND AUDIO PLAYBACK METHOD

(71) Applicant: Deremyr Technology (Beijing) Co., LTD, Beijing (CN)

(72) Inventor: Ming Huo, Beijing (CN)

(73) Assignee: Deremyr Technology (Beijing) Co., LTD, Beijing (CN)

( * ) Notice: Subject to any disclaimer, the term of this patent is extended or adjusted under 35 U.S.C. 154(b) by 187 days.

(21) Appl. No.: 18/133,741

(22) Filed: Apr. 12, 2023

(65) Prior Publication Data

US 2023/0254632 A1 Aug. 10, 2023

(30) Foreign Application Priority Data

Mar. 28, 2023 (CN) .......................... 202310317559.6

(51) Int. Cl.
*H04R 1/10* (2006.01)
*G10K 11/178* (2006.01)
*H04R 27/04* (2006.01)

(52) U.S. Cl.
CPC ....... *H04R 1/1091* (2013.01); *G10K 11/1781* (2018.01); *G10K 2210/108* (2013.01)

(58) Field of Classification Search
CPC ............. H04R 1/1091; G10K 11/1781; G10K 2210/108
USPC .......................................................... 381/74
See application file for complete search history.

(56) References Cited

U.S. PATENT DOCUMENTS

2023/0076171 A1* 3/2023 Daley ................... H04R 25/48

* cited by examiner

*Primary Examiner* — Ammar T Hamid (57) ABSTRACT

The embodiments of the present disclosure disclose an earphone with antenna peripherals and an audio playback method. A specific implementation of the earphone with antenna peripherals comprises a sound cavity assembly, a battery assembly, and an antenna ear handle, wherein the sound cavity assembly includes a front sound cavity and a rear sound cavity, an earphone motherboard and a speaker are arranged between the front sound cavity and the rear sound cavity, the front sound cavity is provided with a sound outlet; the battery assembly includes a front battery cavity and a rear battery cavity, the front battery cavity and the rear battery cavity are connected, and a battery is arranged between the front battery cavity and the rear battery cavity; the sound cavity assembly and the battery assembly are connected through the antenna ear handle, and the earphone motherboard and the battery are connected through a power cord.

10 Claims, 3 Drawing Sheets

EARPHONE WITH ANTENNA PERIPHERALS AND AUDIO PLAYBACK METHOD

CROSS-REFERENCE TO RELATED APPLICATION

The present application is based on, and claims priority from, Chinese application number 202310317559.6, filed Mar. 28, 2023, the disclosure of which is hereby incorporated by reference herein in its entirety.

TECHNICAL FIELD

Embodiments of the present disclosure relate to the technical field of earphones, in particular to an earphone with antenna peripherals and an audio playback method.

BACKGROUND

With the development of technology, wireless earphones have been widely used thanks to such characteristics as easy carry and so on. Currently, most of the relevant earphones are rod or bud type earphones. To be specific, the battery, motherboard, and antenna of the relevant earphones are placed in the same or connected cavities.

However, inventors have found that the following technical issues often arise when using the aforementioned earphones:

First, the battery, motherboard, and antenna of an earphone are placed in the same or connected cavities, there is insufficient space in the cavity, so the size of the antenna that may be installed therein is rather small, resulting in weak signals of the earphone. In addition, because of the conductive materials' shielding effect on signals, and because the battery, speaker, and motherboard all include conductive materials and will generate certain electromagnetic interference waves when in operation, placing the antenna in the same cavity as the battery, speaker, or motherboard will cause interference with the antenna receiving signals, thus further leading to weaker earphone signals.

Second, in the noise reduction mode, most of the related wireless earphones are two earphones performing a noise reduction process on the audio at the same time, thus resulting in high power consumption for both, and leading to poor battery endurance of the earphones.

Third, most related wireless earphones collect a segment of ambient noise and directly simulate inverted sound waves on the basis of that segment to cancel out and reduce noise, but noise reduction in this way is not effective in places with relatively large noise changes, resulting in a poor user experience.

The above information disclosed in this background section is only used to enhance understanding of the background of the concept of this invention, and therefore, it may contain information that does not form the prior art known to those skilled in the art in the country.

SUMMARY

The content of the present disclosure is to introduce concepts in a brief form, which will be described in detail in the specific implementation section below. The content of the present disclosure is not intended to identify key or necessary features of the claimed technical solution, nor is it intended to limit the scope of the claimed technical solution.

Some embodiments of the present disclosure propose an earphone with antenna peripherals and an audio playback method to solve the technical problems mentioned in the background section above.

In the first aspect, some embodiments of the present disclosure provide an earphone with antenna peripherals, which comprises a sound cavity assembly, a battery assembly, and an antenna ear handle, wherein the sound cavity assembly includes a front sound cavity and a rear sound cavity, the front sound cavity and the rear sound cavity are connected, an earphone motherboard and a speaker are arranged between the front sound cavity and the rear sound cavity, the front sound cavity is provided with a sound outlet; the battery assembly includes a front battery cavity and a rear battery cavity, the front battery cavity and the rear battery cavity are connected, and a battery is arranged between the front battery cavity and the rear battery cavity; the sound cavity assembly and the battery assembly are connected through the antenna ear handle, and the earphone motherboard and the battery are connected through a power cord.

Optionally, the material of the antenna ear handle is metal or fiberglass.

Optionally, the material of the antenna ear handle is nickel titanium alloy.

Optionally, the rear battery cavity is provided with at least one charging contact, and each of the at least one charging contact is electrically connected to the battery.

Optionally, the included angle between the axis of the sound outlet hole and the axis of the speaker ranges from 0° to 20°.

Optionally, the included angle between the center line of the antenna ear handle and the axis of the sound outlet ranges from 100° to 160°.

Optionally, the rear sound cavity is provided with a vent hole.

Optionally, the front sound cavity is also provided with an in-ear detection component and/or a tuning hole.

Optionally, both the front sound cavity and the rear sound cavity are made of ceramic material.

Optionally, the earphone motherboard is provided with a microphone.

In the second aspect, some embodiments of the present disclosure provide an audio playback method applied to the earphone with antenna peripherals as described in the first aspect, wherein the earphone with antenna peripherals comprises a sound cavity assembly, a battery assembly, and an antenna ear handle, the sound cavity assembly includes a front sound cavity and a rear sound cavity, and an earphone motherboard and a speaker are provided between the front sound cavity and the rear sound cavity, a microphone is provided on the earphone motherboard; the audio playback method comprises: obtaining a historical ambient audio sequence within the historical time period collected by the microphone, in response to determining that the current time meets a preset working time condition; receiving the audio to be played transmitted by an associated terminal device, through the antenna ear handle; generating an inverted audio sequence based on the historical ambient audio sequence; performing a noise reduction process on the audio to be played based on the inverted audio sequence, to obtain a noise-reduced audio corresponding to the audio to be played; playing the noise-reduced audio through the speaker and transmitting the noise-reduced audio to the associated opposing earphone through the antenna ear handle for synchronous playback; receiving the noise-reduced audio transmitted by the opposing earphone, in response to determining that the current time does not meet the preset working time condition; and playing the noise-reduced audio through the speaker.

Optionally, the generating an inverted audio sequence based on the historical ambient audio sequence includes: determining the decibel of each frame of ambient audio within the ambient audio sequence and obtaining a decibel sequence corresponding to the historical ambient audio sequence; for each decibel in the decibel sequence, determining the absolute value of the difference between the above decibel and the decibel meeting a preset adjacent condition in the decibel sequence, as the decibel change value, to obtain a set of decibel change values, wherein the preset adjacent condition is being adjacent to and behind the above decibel; determining whether the set of decibel change values includes decibel change values that do not meet a preset decibel change condition; determining an inverted ambient audio sequence corresponding to the historical ambient audio sequence, in response to determining that the set of decibel change values does not include decibel change values that do not meet the preset decibel change condition; determining an average decibel of the decibel sequence in response to determining that the set of decibel change values includes decibel change values that do not meet the preset decibel change condition; based on the above set of decibel change values and the above average decibel, selecting a preset audio sequence generation model corresponding to the above average decibel from a set of preset audio sequence generation models, as the target audio sequence generation model; inputting the historical ambient audio sequence into the target audio sequence generation model to obtain a prediction audio sequence corresponding to the historical ambient audio sequence; determining an inverted prediction audio sequence corresponding to the prediction audio sequence; determining the inverted ambient audio sequence or the inverted prediction audio sequence as an inverted audio sequence.

The above embodiments of the present disclosure have the following beneficial effects: the earphone with antenna peripherals in some embodiments of the present disclosure may realize antenna functions by ear handles, avoid the limitation of the earphone cavity on the antenna size, and allow the antenna to be significantly away from the battery, speaker, and motherboard, increase the area where the antenna contacts the signal source, thereby enhancing the antenna's signal receiving ability and signal stability, and enhancing the signal of the earphone. To be specific, the reason for the weak signal of the earphone is that the battery, motherboard, and antenna of the earphone are placed in the same or connected cavities, there is insufficient space in the earphone cavity, so the size of the antenna that may be installed therein is rather small. In addition, because of the conductive materials' shielding effect on signals, and because the battery, speaker, and motherboard all include conductive materials and will generate certain electromagnetic interference waves when in operation, placing the antenna in the same cavity as the battery, speaker, or motherboard will cause interference with the antenna receiving signals. Based on this, the earphone with antenna peripherals in some embodiments of the present disclosure comprises a sound cavity assembly, a battery assembly, and an antenna ear handle. Wherein, the sound cavity assembly includes a front sound cavity and a rear sound cavity. The front sound cavity and the rear sound cavity are connected. An earphone motherboard and a speaker are arranged between the front sound cavity and the rear sound cavity. The front sound cavity is provided with a sound outlet. The battery assembly includes a front battery cavity and a rear battery cavity. The front battery cavity and the rear battery cavity are connected. A battery is arranged between the front battery cavity and the rear battery cavity. The sound cavity assembly and the battery assembly are connected through the antenna ear handle. The earphone motherboard and the battery are connected through a power cord. Because the ear handle connecting the audio cavity assembly and the battery assembly realizes the antenna function, thereby avoiding the limitation of the earphone cavity on the antenna size, the antenna size may be properly increased, thereby enhancing the earphone signal. Therefore, the earphone with antenna peripherals in some embodiments of the present disclosure may realize antenna functions by ear handles, avoid the limitation of the earphone cavity on the antenna size, and allow the antenna to be significantly away from the battery, speaker, and motherboard, increase the area where the antenna contacts the signal source, thereby enhancing the antenna's signal receiving ability and signal stability, and enhancing the signal of the earphone.

BRIEF DESCRIPTION OF THE DRAWINGS

The above and other features, advantages, and aspects of the embodiments of the present disclosure will become more apparent in conjunction with the accompanying drawings and with reference to the following specific implementations. Throughout the drawings, the same or similar reference signs indicate the same or similar elements. It should be understood that the drawings are schematic, and the components and elements are not necessarily drawn to scale.

DETAILED DESCRIPTION OF THE INVENTION

Hereinafter, the embodiments of the present disclosure will be described in more detail with reference to the accompanying drawings. Although certain embodiments of the present disclosure are shown in the drawings, it should be understood that the present disclosure may be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, not to limit the protection scope of the present disclosure.

In the description of the present disclosure, it should be noted that, unless otherwise explicitly specified and limited, the terms "set" and "connection" should be understood in a broad sense, for example, they may be fixed connection, removable connection, or integral connection; or mechanical connection or electrical connection; they may be direct connection, or indirect connection through intermediate media, or internal connection between two components. For those skilled in the art, the specific meaning of the above terms in the present disclosure shall be understood according to specific circumstances.

Besides, it should be noted that, for ease of description, only the portions related to the relevant disclosure are shown in the drawings. In the case of no confliction, the embodiments in the present disclosure and the features in the embodiments may be combined with each other.

It should be noted that concepts such as "first" and "second" mentioned in the present disclosure are only used to distinguish different devices, modules or units, and are not used to limit the order of functions performed by these devices, modules or units or interdependence thereof.

It should be noted that such adjuncts as "one" and "more" mentioned in the present disclosure are illustrative, not restrictive, and those skilled in the art should understand that, unless the context clearly indicates otherwise, they should be understood as "one or more".

The names of messages or information exchanged between multiple devices in the embodiments of the present disclosure are only for illustrative purposes, and are not intended to limit the scope of these messages or information.

The present disclosure will be described in detail below with reference to the accompanying drawings and in conjunction with embodiments.

Figure 1:
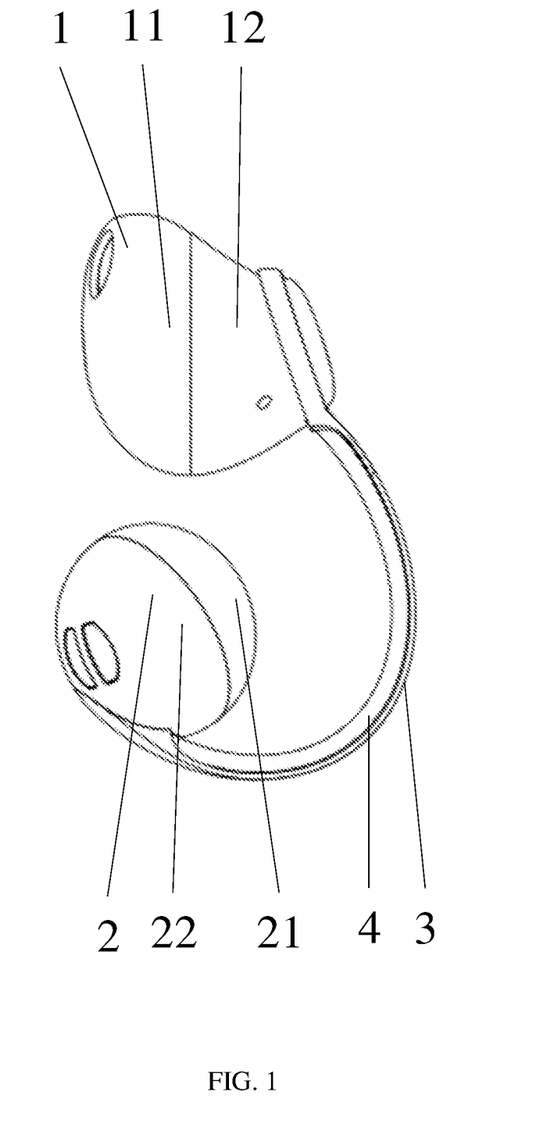
FIG. 1 is a structural diagram of some embodiments of the earphone with antenna peripherals according to the present disclosure.

FIG. 1 is a structural diagram of some embodiments of the earphone with antenna peripherals according to the present disclosure. FIG. 1 includes a sound cavity assembly 1, a battery assembly 2, an antenna ear handle 3, and a power cord 4. Wherein, the sound cavity assembly 1 includes a front sound cavity 11 and a rear sound cavity 12. The battery assembly 2 includes a front battery cavity 21 and a rear battery cavity 22.

Figure 2:
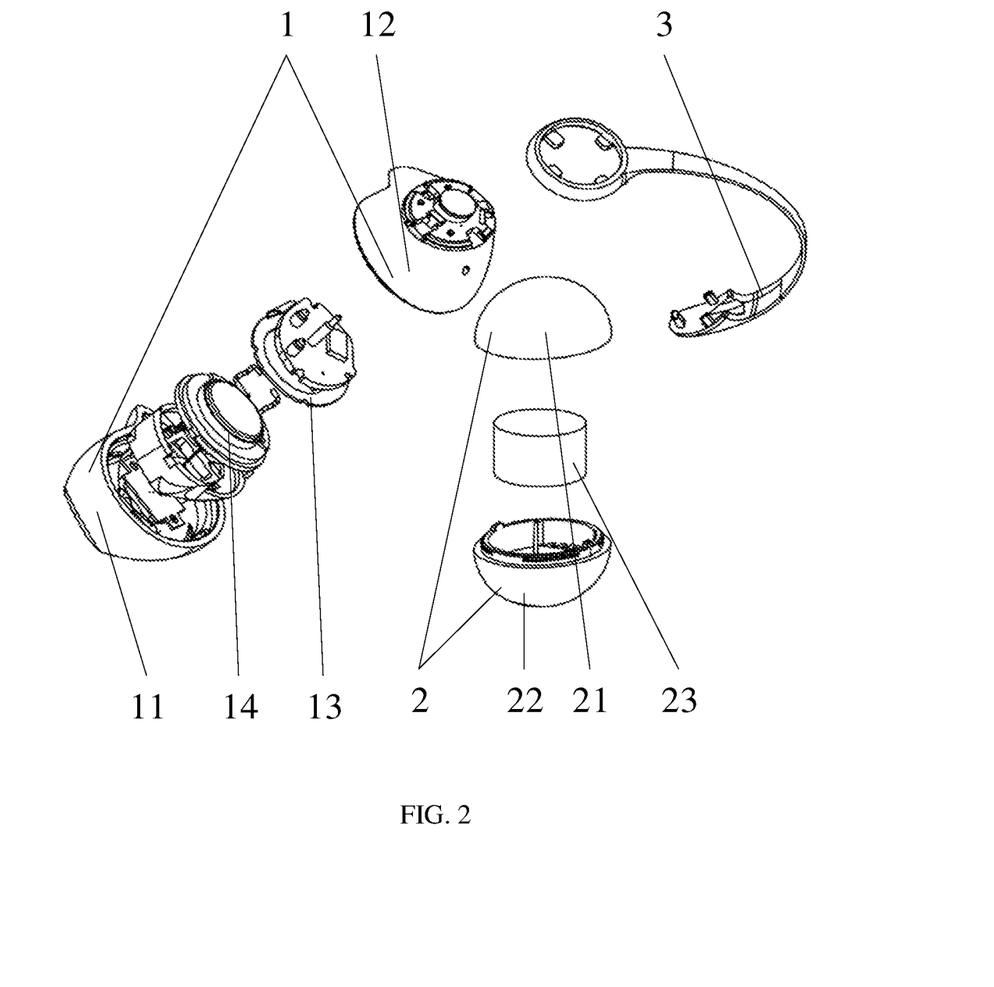
FIG. 2 is an exploded view of some embodiments of the earphone with antenna peripherals according to the present disclosure.

FIG. 2 is an exploded view of some embodiments of the earphone with antenna peripherals according to the present disclosure. FIG. 2 includes a sound cavity assembly 1, a battery assembly 2, and an antenna ear handle 3. Wherein, the sound cavity assembly 1 includes a front sound cavity 11, a rear sound cavity 12, a headphone motherboard 13, and a speaker 14. The battery assembly 2 includes a front battery cavity 21, a rear battery cavity 22, and a battery 23.

In some embodiments, the earphone described above includes a sound cavity assembly 1, a battery assembly 2, and an antenna ear handle 3. Wherein, the sound cavity component 1 may be a component for playing audio. The battery assembly 2 may be a component that provides power. The antenna ear handle 3 may be a handle that connects the sound cavity assembly 1 and the battery assembly 2 and assumes the antenna function. The sound cavity assembly 1 may include a front sound cavity 11 and a rear sound cavity 12. The front sound cavity 11 and the rear sound cavity 12 may be housings for carrying an earphone motherboard 13 and a speaker 14. The front sound cavity 11 may be connected to the rear sound cavity 12. Here, there is no limitation on the specific methods of connecting the front sound cavity 11 and the rear sound cavity 12. As an example, the specific methods for connecting the front sound cavity 11 and the rear sound cavity 12 may include, but are not limited to, welding, bonding, and snap connection. A headphone motherboard 13 and a speaker 14 may be arranged between the front sound cavity 11 and the rear sound cavity 12. The earphone motherboard 13 may be a circuit board. The speaker 14 may be a loudspeaker. The earphone motherboard 13 may be connected to the speaker 14 through an electric wire. The earphone motherboard 13 and the speaker 14 may be clamped inside the front sound cavity 11 and the rear sound cavity 12. The front sound cavity 11 may be provided with a sound outlet. The sound outlet may be an opening for sound transmission. Further, the exterior of the sound outlet may be provided with a dustproof mesh.

In some embodiments, the above battery assembly 2 may include a front battery cavity 21 and a rear battery cavity 22. The front battery cavity 21 and the rear battery cavity 22 may be housings for carrying batteries. The front battery cavity 21 may be connected to the rear battery cavity 22. Here, there is no limitation on the specific methods of connecting the front battery cavity 21 and the rear battery cavity 22. As an example, the specific methods for connecting the front battery cavity 21 and the rear battery cavity 22 may include, but are not limited to, welding, bonding, and snap connection. A battery 23 may be provided between the front battery cavity 21 and the rear battery cavity 22. The battery 23 may be clamped inside the front battery cavity 21 and the rear battery cavity 22.

In some embodiments, the sound cavity assembly 1 and the battery assembly 2 may be connected through the antenna ear handle 3. To be specific, the two ends of the antenna ear handle 3 may be respectively connected to the sound cavity assembly 1 and the battery assembly 2. There is no limitation on the specific ways in which the two ends of the antenna ear handle 3 may be connected to the sound cavity assembly 1 and the battery assembly 2 respectively. As an example, the two ends of the antenna ear handle 3 may be respectively clamped to the sound cavity assembly 1 and the battery assembly 2. An antenna feed point and a ground feed point may be provided at the connection between the antenna ear handle 3 and the sound cavity assembly 1. The antenna feed point and the ground feed point may be connected to the earphone motherboard 13 through a thimble provided on the earphone motherboard 13. To be specific, when the antenna ear handle 3 is connected to the sound cavity assembly 1, the antenna feed point and ground feed point on the antenna ear handle contact the thimble provided on the earphone motherboard 13. The antenna ear handle 3 may transmit RF (radio frequency) signals to the headphone motherboard 13 through the antenna feed point. The ground feed point may be grounded through the earphone motherboard 13. In practice, the earphone motherboard 13 may transmit Bluetooth RF signals to the antenna ear handle 3 through the antenna feed point. The antenna ear handle 3 may radiate signals in the form of radiation or receive radio frequency signals from mobile phones or other Bluetooth devices to achieve the function of wireless transmission of Bluetooth signals. As an example, the antenna ear handle 3 may be, but is not limited to, any of the following: monopole antenna, PIFA (Planar Inverted F-shaped Antenna) antenna, IFA (Inverted-F Antenna), inverted-L antenna, Loop antenna, spiral antenna, PCB (Printed Circuit Board) antenna, slot antenna, FICA (Folded Inverted Conformal Antenna). The earphone motherboard 13 and the battery 23 may be connected through a power cord 4. To be specific, one end of the power cord 4 may be connected to the battery 23. The other end of the power cord 4 may be connected to the headphone motherboard 13. Therefore, because the ear handle connecting the sound cavity assembly and the battery assembly realizes the antenna function, the limitation of the earphone cavity on the antenna size is avoided, thereby enhancing the earphone signal.

Optionally, the material of the antenna ear handle 3 may be metal or fiberglass. As a result, receiving and transmitting signals through a metal antenna can make the performance of the earphone improved, the stability better, and the distance of transmission farther.

Further, the exterior of the antenna ear handle 3 may be wrapped by a plastic layer.

Optionally, the material of the antenna ear handle 3 may be nickel titanium alloy. The antenna ear handle made of nickel titanium alloy may satisfy the antenna function while providing such performance as abrasion resistance, anti-corrosion, strong toughness, and high elasticity, so is more comfortable to wear.

Further, the curved shape of the antenna ear handle conforms to the ergonomics of most people's ears.

Optionally, the power cord 4 may be located inside the antenna ear handle 3. Therefore, it is possible to avoid direct contact between the antenna ear handle 3 and the human ear, thereby improving user comfort. The antenna ear handle may protect the power cord from stretching and tearing, thereby ensuring that the power cord may stably connect to the motherboard and power supply.

Optionally, at least one charging contact may be provided on the rear battery cavity 22. The charging contact may be a contact for contacting a charging probe to charge the battery. Each of the at least one charging contact point may be electrically connected to the battery. Therefore, the battery may be charged through the at least one charging contact.

Optionally, the included angle between the axis of the sound outlet and the axis of the speaker 14 may range from 0° to 20°.

Optionally, the included angle between the center line of the antenna ear handle 3 and the axis of the sound outlet may range from 100° to 160°.

Optionally, the rear sound cavity 12 may be provided with a vent hole. The vent hole may be used to balance the internal pressure and improve the sound quality. Therefore, the pressure in the cavity may be balanced through the vent hole to improve the sound quality.

Optionally, the front sound cavity 11 may also be provided with an in-ear detection component and/or a tuning hole. A laser transmitter is arranged at a position corresponding to the in-ear detection component. The laser emitting component may be connected to the earphone motherboard 13. Therefore, it is possible to detect whether the earphone is in a wearing state through the in-ear detection component. The sound quality of audio played may be improved through the tuning hole.

Optionally, both the front sound cavity 11 and the rear sound cavity 12 may be made of ceramic material. Because ceramics have excellent high-temperature resistant mechanical properties, chemical corrosion resistance, high-temperature oxidation resistance and abrasion resistance, the high-temperature resistant mechanical properties, chemical corrosion resistance, high-temperature oxidation resistance, and abrasion resistance of the front and rear sound cavities may be improved.

Optionally, the earphone motherboard is provided with a microphone.

The above embodiments of the present disclosure have the following beneficial effects: the earphone with antenna peripherals in some embodiments of the present disclosure may realize antenna functions by ear handles, avoid the limitation of the earphone cavity on the antenna size, and allow the antenna to be significantly away from the battery, speaker, and motherboard, increase the area where the antenna contacts the signal source, thereby enhancing the antenna's signal receiving ability and signal stability, and enhancing the signal of the earphone. To be specific, the reason for the weak signal of the earphone is that the battery, motherboard, and antenna of the earphone are placed in the same or connected cavities, there is insufficient space in the earphone cavity, so the size of the antenna that may be installed therein is rather small. In addition, because of the conductive materials' shielding effect on signals, and because the battery, speaker, and motherboard all include conductive materials and will generate certain electromagnetic interference waves when in operation, placing the antenna in the same cavity as the battery, speaker, or motherboard will cause interference with the antenna receiving signals. Based on this, the earphone with antenna peripherals in some embodiments of the present disclosure comprises a sound cavity assembly, a battery assembly, and an antenna ear handle. Wherein, the sound cavity assembly includes a front sound cavity and a rear sound cavity. The front sound cavity and the rear sound cavity are connected. An earphone motherboard and a speaker are arranged between the front sound cavity and the rear sound cavity. The front sound cavity is provided with a sound outlet. The battery assembly includes a front battery cavity and a rear battery cavity. The front battery cavity and the rear battery cavity are connected. A battery is arranged between the front battery cavity and the rear battery cavity. The sound cavity assembly and the battery assembly are connected through the antenna ear handle. The earphone motherboard and the battery are connected through a power cord. Because the ear handle connecting the audio cavity assembly and the battery assembly realizes the antenna function, thereby avoiding the limitation of the earphone cavity on the antenna size, the antenna size may be properly increased, thereby enhancing the earphone signal. Therefore, the earphone with antenna peripherals in some embodiments of the present disclosure may realize antenna functions by ear handles, avoid the limitation of the earphone cavity on the antenna size, and allow the antenna to be significantly away from the battery, speaker, and motherboard, increase the area where the antenna contacts the signal source, thereby enhancing the antenna's signal receiving ability and signal stability, and enhancing the signal of the earphone.

Figure 3:
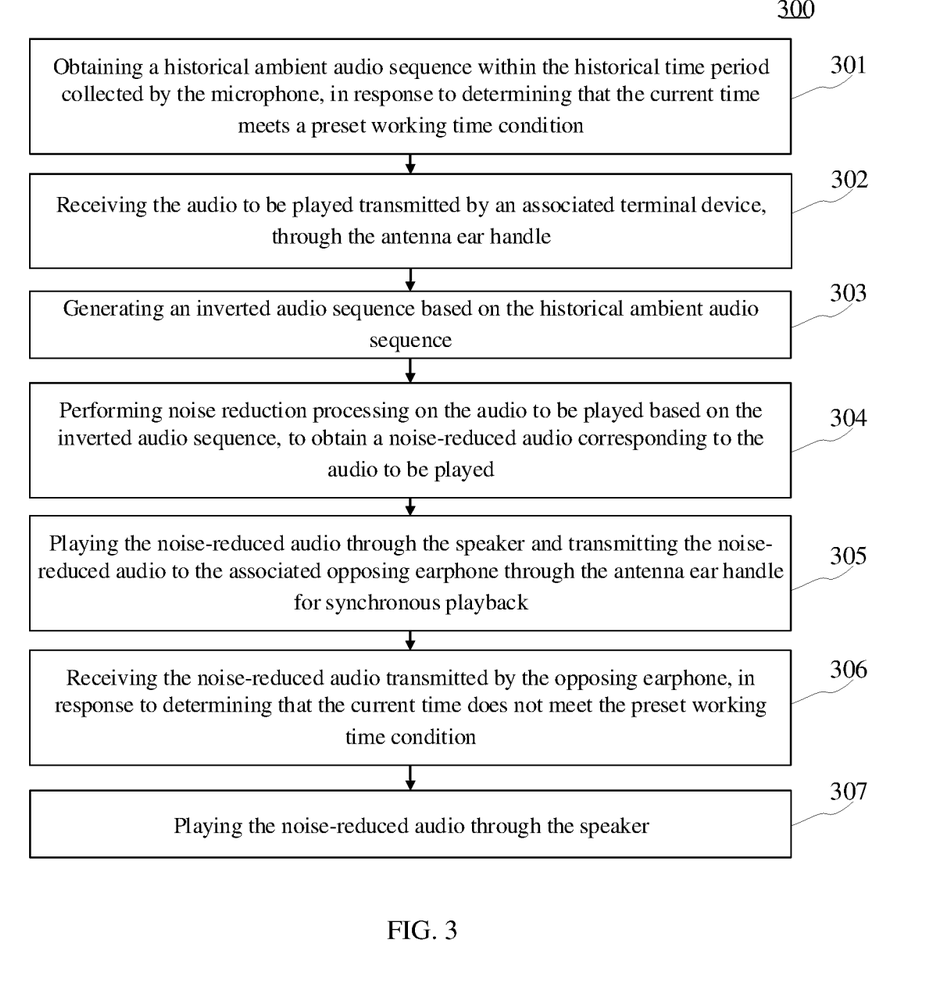
FIG. 3 is a flowchart of some embodiments of the audio playback method according to the present disclosure.

Continuing to see FIG. 3, a flowchart 300 of some embodiments of an audio playback method according to the present disclosure is shown, which includes the following steps:

Step 301, obtaining a historical ambient audio sequence within the historical time period collected by the microphone, in response to determining that the current time meets a preset working time condition.

In some embodiments, the executing body of the audio playback method (such as the earphone with antenna peripherals shown in FIG. 1) may obtain a historical ambient audio sequence within the historical time period collected by the microphone, in response to determining that the current time meets a preset working time condition. Wherein, the earphone with antenna peripherals may include a sound cavity assembly, a battery assembly, and an antenna ear handle. The sound cavity assembly may include a front sound cavity and a rear sound cavity. A headphone motherboard and a speaker may be arranged between the front sound cavity and the rear sound cavity. The earphone motherboard may be provided with a microphone. The preset working time condition may be that the executing body is in a working time period. As an example, the executing body may be a right earphone. When users use both the left and right earphones simultaneously, the right and left earphones may take turns reducing noise for 30 minutes. The above historical time period may be the first minute of the current time. In practice, the audio collected by the microphone may be stored in the memory included in the headphone motherboard. The executing body may obtain a historical ambient audio sequence within the historical time period collected by the microphone from the memory.

Step 302, receiving the audio to be played transmitted by an associated terminal device, through the antenna ear handle.

In some embodiments, the above executing body may receive the audio to be played transmitted by an associated terminal device through the antenna ear handle. Wherein, the audio to be played may be the audio that needs to be played. For example, the audio to be played may be a piece of music. The terminal device may be a mobile phone, a computer, or a tablet.

Step 303, generating an inverted audio sequence based on the historical ambient audio sequence.

In some embodiments, the above executing body may generate an inverted audio sequence based on the historical ambient audio sequence. Wherein, the inverted audio sequence may be an audio sequence having the opposite phase but the same amplitude and frequency as the historical ambient audio sequence. As an example, the executing body may perform phase inversion processing on the historical ambient audio sequence to obtain an inverted audio sequence. To be specific, the executing body may determine an audio sequence that has the opposite phase but the same amplitude and frequency as the historical ambient audio sequence, as an inverted audio sequence.

In certain alternative implementations of some embodiments, based on the historical ambient audio sequence described above, the above executing body may generate an inverted audio sequence through the following steps:

The first step, determining the decibel of each frame of ambient audio within the ambient audio sequence and obtaining a decibel sequence corresponding to the historical ambient audio sequence, wherein, each decibel in the above decibel sequence may be sorted in chronological order.

The second step, for each decibel in the decibel sequence, determining the absolute value of the difference between the above decibel and the decibel meeting a preset adjacent condition in the decibel sequence, as the decibel change value, to obtain a set of decibel change values, wherein the preset adjacent condition is being adjacent to and behind the above decibel. As an example, for the first decibel in the above decibel sequence, the above executing body may determine the absolute value of the difference between the first decibel and the second decibel as the decibel change value.

The third step, determining whether the set of decibel change values includes decibel change values that do not meet a preset decibel change condition. Wherein, the above preset decibel change condition may be such that the decibel change value is less than or equal to a preset decibel change threshold. The preset decibel change threshold may be a preset decibel change value.

The fourth step, determining an inverted ambient audio sequence corresponding to the historical ambient audio sequence, in response to determining that the set of decibel change values does not include decibel change values that do not meet the preset decibel change condition. In practice, in response to determining that the set of decibel change values does not include decibel change values that do not meet the preset decibel change condition, the above executing body may perform phase inversion processing on the historical ambient audio sequence to obtain an inverted ambient audio sequence. To be specific, the above executing body may determine an audio sequence that has the opposite phase but the same amplitude and frequency as the historical ambient audio sequence, as an inverted ambient audio sequence.

The fifth step, based on the above average decibel, selecting a preset audio sequence generation model corresponding to the above average decibel, from a set of preset audio sequence generation models, as the target audio sequence generation model, wherein, the preset audio sequence generation model may be a pre-trained machine learning model that takes the historical ambient audio sequence as input and the prediction audio sequences as output. For example, the preset audio sequence generation model may be a CNN (Convolutional Neural Network). Each preset audio sequence generation model in the set of preset audio sequence generation models may be applied to different scenes. As an example, the above executing body may preset three scenes. Wherein, each scene corresponds to a decibel range. For example, the decibel range corresponding to a quiet scene may be (0 dB, 40 dB]. The decibel range corresponding to a regular scene may be (40 dB, 70 dB]. The decibel range corresponding to a noisy scene may be greater than 70 dB. In practice, first of all, the above executing body may determine the decibel range in which the above average decibel is located. As an example, the average decibel may be 50 dB, which corresponds to the decibel range of (40 dB, 70 dB]. Then, based on the determined decibel range, determine the scene where the user stays. For example, the scene where the user stays may be a regular scene. In the end, the executing body may determine the preset audio sequence generation model corresponding to the scene where the user stays, in the set of preset audio sequence generation models, as the target audio sequence generation model.

The sixth step, inputting the historical ambient audio sequence into the target audio sequence generation model to obtain a prediction audio sequence corresponding to the historical ambient audio sequence.

The seventh step, determining an inverted prediction audio sequence corresponding to the prediction audio sequence. In practice, the executing body may perform phase inversion processing on the predicted audio sequence to obtain an inverted prediction audio sequence. To be specific, the executing body may determine an audio sequence that has the opposite phase but the same amplitude and frequency as the prediction audio sequence, as an inverted prediction audio sequence.

The eighth step, determining the inverted ambient audio sequence or the inverted prediction audio sequence as an inverted audio sequence.

As an inventive point of the present disclosure, the related content above solves the third technical problem mentioned in the background section: "Most related wireless earphones collect a segment of ambient noise and directly simulate inverted sound waves on the basis of that segment to cancel out and reduce noise, but noise reduction in this way is not effective in places with relatively large noise changes, resulting in a poor user experience." The factor that leads to a poor user experience is often as follows: Most related wireless earphones collect a segment of ambient noise and directly simulate inverted sound waves on the basis of that segment to cancel out and reduce noise, but noise reduction in this way is not effective in places with relatively large noise changes. To achieve this effect, first, determine the decibel of each frame of ambient audio within the ambient audio sequence and obtain a decibel sequence corresponding to the historical ambient audio sequence. Then, for each decibel in the decibel sequence, determine the absolute value of the difference between the above decibel and the decibel meeting a preset adjacent condition in the decibel sequence, as the decibel change value, to obtain a set of decibel change values. Wherein, the preset adjacent condition is being adjacent to and behind the above decibel. Thereafter, determine whether the set of decibel change values includes decibel change values that do not meet a preset decibel change condition. Therefore, determine an inverted ambient audio sequence corresponding to the historical ambient audio sequence, in response to determining that the set of decibel change values does not include decibel change values that do not meet the preset decibel change condition. Therefore, it is possible to simulate inverted sound waves based on the historical ambient audio sequence to cancel out and reduce noise when the noise change is small. After that, in response to determining that the set of decibel change values includes decibel change values that do not meet the preset decibel change condition, determine an average decibel of the decibel sequence. Then, based on the above set of decibel change values and the above average decibel, select a preset audio sequence generation model corresponding to the above average decibel, from a set of preset audio sequence generation models, as the target audio sequence generation model. After that, input the historical ambient audio sequence into the target audio sequence generation model to obtain a prediction audio sequence corresponding to the historical ambient audio sequence. Then, determine an inverted prediction audio sequence corresponding to the prediction audio sequence. In the end, determine the inverted ambient audio sequence or the inverted prediction audio sequence as an inverted audio sequence. Therefore, when the noise change is fairly great, a corresponding preset audio sequence generation model may be selected based on the size of the noise decibel to determine the prediction audio sequence, so that inverted sound waves may be simulated based on the audio obtained from prediction, to cancel out and reduce noise. Because the audio obtained from prediction is closer to the actual noise, the noise reduction effect may be improved, thereby improving the user experience.

Step 304, performing a noise reduction process on the audio to be played based on the inverted audio sequence, to obtain a noise-reduced audio corresponding to the audio to be played.

In some embodiments, the above executing body may perform a noise reduction process on the audio to be played based on the inverted audio sequence to obtain a noise-reduced audio corresponding to the audio to be played. In practice, the executing body may play the audio corresponding to the inverted audio sequence to cancel out the ambient noise, thereby achieving noise reduction.

Step 305, playing the noise-reduced audio through the speaker and transmitting the noise-reduced audio to the associated opposing earphone through the antenna ear handle, for synchronous playback.

In some embodiments, the executing body may play the noise-reduced audio through the speaker and transmitting the noise-reduced audio to the associated opposing earphone through the antenna ear handle, for synchronous playback. Wherein, the associated opposing earphone may be an earphone paired with the earphone with antenna peripherals. Therefore, transmitting the noise-reduced audio to the opposing earphone instead of simultaneously performing noise reduction processing on the opposing earphone side may reduce the power consumption of the earphone, thereby extending the earphone's battery endurance.

Step 306, receiving the noise-reduced audio transmitted by the opposing earphone in response to determining that the current time does not meet the preset working time condition.

In some embodiments, the above executing body may receive the noise-reduced audio transmitted by the opposing earphone in response to determining that the current time does not meet the preset working time condition. It should be understood that in response to determining that the current time does not meet the preset working time condition, the opposing earphone may perform noise reduction on the audio to be played to obtain noise-reduced audio. Besides, the opposing earphone may transmit the obtained noise-reduced audio to the above executing body. In practice, in response to the fact that the current time does not belong to the time period during which the executing body performs noise reduction, the executing body may obtain the noise-reduced audio from the opposing earphone.

Step 307, playing the noise-reduced audio through the speaker.

In some embodiments, the above executing body may play the noise-reduced audio through the speaker.

The above embodiments of the present disclosure have the following beneficial effects: The audio playback method of some embodiments of the present disclosure may reduce the power consumption of an earphone and extend the battery endurance thereof. To be specific, the reason for the poor battery endurance of an earphone is that, in the noise reduction mode, most of the related wireless earphones are two earphones performing noise reduction processing on the audio at the same time. On this basis, the audio playback method of some embodiments of the present disclosure is applied to an earphone with antenna peripherals described in the first aspect, wherein the earphone with antenna peripherals comprises a sound cavity assembly, a battery assembly, and an antenna ear handle. The sound cavity assembly includes a front sound cavity and a rear sound cavity. An earphone motherboard and a speaker are arranged between the front sound cavity and the rear sound cavity. The earphone motherboard is provided with a microphone. First, obtain a historical ambient audio sequence within the historical time period collected by the microphone in response to determining that the current time meets a preset working time condition, whereby the ambient noise can be collected. Second, receive the audio to be played transmitted by an associated terminal device through the antenna ear handle. Then, generate an inverted audio sequence based on the historical ambient audio sequence. The inverted audio sequence obtained thereby may be used for noise reduction of the audio to be played. Thereafter, perform noise reduction processing on the audio to be played based on the inverted audio sequence, to obtain a noise-reduced audio corresponding to the audio to be played, thereby obtaining the noise-reduced audio to be displayed. Then, play the noise-reduced audio through the speaker, and transmit the noise-reduced audio to the associated opposing earphone through the antenna ear handle for synchronous playback. Therefore, by transmitting the noise-reduced audio to be played to another earphone, there is no need for the other earphone to undergo noise reduction again, thus reducing the waste of power. Then, in response to determining that the above current time does not meet the preset working time condition, receive the noise-reduced audio transmitted by the opposing earphone. After a period of time, switch to another earphone to reduce the noise of the audio to be played, thereby directly obtaining a noise-reduced audio to be played. In the end, play the noise-reduced audio through the speaker. Because the above audio playback method may achieve two earphones taking turns to perform noise reduction processing on the audio, there is no need for two earphones to perform noise reduction processing on the audio at the same time, thus reducing the time for noise reduction, and reducing the power consumption of the earphones, thereby extending the earphone's battery endurance. Therefore, the audio playback method of some embodiments of the present disclosure can reduce the power consumption of the earphones and extend the battery endurance thereof.

The above description is merely some preferred embodiments of the present disclosure and illustrations of the applied technical principles. Those skilled in the art should understand that the scope of the invention involved in the embodiments of the present disclosure is not limited to the technical solutions formed by the specific combination of the above technical features, and should cover at the same time, without departing from the above inventive concept, other technical solutions formed by any combination of the above technical features or their equivalent features, for example, a technical solution formed by replacing the above features with the technical features of similar functions disclosed (but not limited to) in the embodiments of the present disclosure.

What is claimed is:

1. An earphone with antenna peripherals, comprising a sound cavity assembly, a battery assembly, and an antenna ear handle, wherein, the sound cavity assembly includes a front sound cavity and a rear sound cavity, the front sound cavity and the rear sound cavity are connected, an earphone motherboard and a speaker are arranged between the front sound cavity and the rear sound cavity, the front sound cavity is provided with a sound outlet;

the battery assembly includes a front battery cavity and a rear battery cavity, the front battery cavity and the rear battery cavity are connected, a battery is arranged between the front battery cavity and the rear battery cavity;

the sound cavity assembly and the battery assembly are connected through the antenna ear handle, the earphone motherboard and the battery are connected through a power cord.

2. The earphone with antenna peripherals according to claim 1, wherein, a material of the antenna ear handle is metal or fiberglass.

3. The earphone with antenna peripherals according to claim 2, wherein, the material of the antenna ear handle is nickel titanium alloy.

4. The earphone with antenna peripherals according to claim 1, wherein, the power cord is located inside the antenna ear handle.

5. The earphone with antenna peripherals according to claim 1, wherein, the rear battery cavity is provided with at least one charging contact, and each of the at least one charging contact is electrically connected to the battery.

6. The earphone with antenna peripherals according to claim 1, wherein, the rear sound cavity is provided with a vent hole.

7. The earphone with antenna peripherals according to claim 1, wherein, the front sound cavity is also provided with an in-ear detection component and/or a tuning hole.

8. The earphone with antenna peripherals according to claim 1, wherein, both the front sound cavity and the rear sound cavity are made of ceramic material.

9. The earphone with antenna peripherals according to claim 1, wherein, the earphone motherboard is provided with a microphone.

10. An audio playback method, which is applied to the earphone with antenna peripherals as described in claim 9, wherein the earphone with antenna peripherals comprises a sound cavity assembly, a battery assembly, and an antenna ear handle, the sound cavity assembly includes a front sound cavity and a rear sound cavity, and an earphone motherboard and a speaker are provided between the front sound cavity and the rear sound cavity, a microphone is provided on the earphone motherboard, the audio playback method comprising:

obtaining a historical ambient audio sequence within a historical time period collected by the microphone in response to determining that a current time meets a preset working time condition;

receiving the audio to be played transmitted by an associated terminal device through the antenna ear handle;

generating an inverted audio sequence based on the historical ambient audio sequence;

performing a noise reduction process on the audio to be played based on the inverted audio sequence, to obtain a noise-reduced audio corresponding to the audio to be played;

playing the noise-reduced audio through the speaker, and transmitting the noise-reduced audio to an associated opposing earphone through the antenna ear handle for synchronous playback;

receiving the noise-reduced audio transmitted by the opposing earphone in response to determining that the current time does not meet the preset working time condition; and playing the noise-reduced audio through the speaker.

* * * * *